(12) United States Patent
Ladrech et al.

(10) Patent No.: US 9,968,908 B2
(45) Date of Patent: May 15, 2018

(54) COMPOSITION COMPRISING AN ACTIVATED CARBON, A ZEOLITE, AND FE IONS FOR A VEHICLE PASSENGER COMPARTMENT AIR FILTER

(75) Inventors: Frederic Ladrech, Maurepas (FR); Amanda Martinell, Neauphie le Chateau (FR); Natacha Caudy, Caen (FR); Laetitia Del Fabbro, Guyancourt (FR); Michel Ondarts, Chambery (FR); Cecile Hort, Lee (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 961 days.

(21) Appl. No.: 13/511,922

(22) PCT Filed: Nov. 26, 2010

(86) PCT No.: PCT/EP2010/068339
§ 371 (c)(1),
(2), (4) Date: Oct. 24, 2012

(87) PCT Pub. No.: WO2011/064346
PCT Pub. Date: Jun. 3, 2011

(65) Prior Publication Data
US 2013/0040804 A1    Feb. 14, 2013

(30) Foreign Application Priority Data
Nov. 27, 2009    (FR) .................... 09 05736

(51) Int. Cl.
*B01J 20/18*    (2006.01)
*B01J 20/20*    (2006.01)
(Continued)

(52) U.S. Cl.
CPC ............ *B01J 20/186* (2013.01); *B01D 53/02* (2013.01); *B01D 53/04* (2013.01); *B01J 20/20* (2013.01);
(Continued)

(58) Field of Classification Search
None
See application file for complete search history.

(56) References Cited

U.S. PATENT DOCUMENTS 4,604,110 A *  8/1986  Frazier .......................... 95/128
6,022,399 A *  2/2000  Ertl et al. ....................... 95/114
(Continued)

FOREIGN PATENT DOCUMENTS

DE        299 622 A5    4/1992
EP        1 121 978 A2  8/2001
(Continued)

OTHER PUBLICATIONS

Database WPI, Week 200328 Tomson Scientific, London, FB; XP-002586977 (2 pages).
(Continued)

*Primary Examiner* — Melvin C. Mayes
*Assistant Examiner* — Michael Forrest
(74) *Attorney, Agent, or Firm* — Osha Liang LLP

(57) ABSTRACT

The invention relates to a composition (1) comprising an activated carbon (4) and a zeolite (2), the zeolite (2) comprising Fe ions. The invention also relates to an air filter (12) for a ventilation, heating, and/or air conditioning system comprising this composition (1).

10 Claims, 7 Drawing Sheets

(51) Int. Cl.
  *B01D 53/02*   (2006.01)
  *B01D 53/04*   (2006.01)

(52) U.S. Cl.
  CPC .. *B01D 2253/102* (2013.01); *B01D 2253/106* (2013.01); *B01D 2253/108* (2013.01); *B01D 2253/1122* (2013.01); *B01D 2253/306* (2013.01); *B01D 2253/311* (2013.01)

(56) References Cited

U.S. PATENT DOCUMENTS

| | | | |
|---|---|---|---|
| 6,344,071 B1 * | 2/2002 | Smith | B01D 53/02 502/401 |
| 2005/0075238 A1 | 4/2005 | Kimmel Taji et al. | |
| 2008/0293614 A1 * | 11/2008 | Bishop et al. | 510/507 |

FOREIGN PATENT DOCUMENTS

| | | | | |
|---|---|---|---|---|
| EP | 1847318 A2 | * | 10/2007 | ............ B01J 20/28 |
| JP | 2003-20489 A | | 1/2003 | |
| JP | 2003020489 A | * | 1/2003 | ............ C10L 3/10 |
| JP | 2007-154505 A | | 6/2007 | |

OTHER PUBLICATIONS

Database WPI, Week 200872 Tomson Scientific, London, FB; XP-002587022 (2 pages).
Database Compendex Engineering Information, Inc., New York; 1996; XP002586978 (2 pages).
Database WPI, Week 200726 Tomson Scientific, London, FB; XP-002586979 (2 pages).
espacenet Abstract Publication DD299622 dated Apr. 30, 1992 (1 page).

* cited by examiner

COMPOSITION COMPRISING AN ACTIVATED CARBON, A ZEOLITE, AND FE IONS FOR A VEHICLE PASSENGER COMPARTMENT AIR FILTER

The invention relates to the compositions comprising an activated carbon, a zeolite and Fe ions used in air filters for a ventilation, heating, and/or air conditioning system for automotive vehicles. The invention further relates to air filters comprising such a composition.

The passenger compartment filtration serves to filter both pollutants in particle form and gaseous pollutants. Today there are two types of filter on the market. Firstly, particulate filters that only aim to filter air particles between 0.1 and 10 µm and larger. Secondly, combined filters that function in two ways, not only to filter particles, but also gases and odors coming from either outside the passenger compartment, or from the passenger compartment itself when the air inlet flap for the ventilation, heating, and/or air conditioning system is set to recirculate.

Today, combined filters use activated carbons to purify air of gases and odors (a non-woven layer sandwiching this layer of carbon by means of various assembly methods). Activated carbons used are commonly selected for their affinity for retaining four test gases: toluene, n-butane, nitrogen dioxide, and sulfur dioxide. These tests are mainly performed according to ISO-11 155 part 2. This standard describes a method using the four previously cited gases at high concentrations. Filter performance is tested for one gas at a time, not using mixtures.

The results of tests obtained using this standard show varying affinities between the carbons used and the pollutants used to evaluate the overall performance of the filter. Thus, some pollutants—standard test gases or other gases—are only partially stopped by the carbons used conventionally. Moreover, performance as the activated carbon ages, i.e. as it adsorbs pollutants—declines at varying rates as the carbon's active sites are occupied. This decline also varies depending on the carbons and the gases tested, and also the humidity and temperature conditions that the carbons are subjected to.

To improve filtration performance for air filters, using both an activated carbon and a zeolite has been proposed. Indeed, some zeolites have good filtration affinity for gaseous pollutants such as aldehydes. An example of such usage is described in document EP1121978. Using zeolite with crystalline structure ZSM-5 (also known as Pentasil) with Si/Al ratios of between 30 and 190 and preferably between 55 and 90 is described there. The zeolites used comprise quaternary ammoniums ($NH_4^+$) to improve their affinity for aldehydes.

Other documents also discuss the use of zeolite for filtration solutions. Accordingly, US patent 2005075238 proposes the use of a zeolite mixed with carbon and lithium for the combined filtration of VOCs, CO, $CO_2$ and to dehumidify. However, in this document, the only function of the zeolite is to dehumidify, not to adsorb VOCs (volatile organic compounds, a group that includes aldehydes), as the carbon does this.

The applicant has sought to improve the filtration of particulate pollutants and especially gaseous pollutants. In particular, the applicant has sought to obtain a composition that filters the largest number of gaseous pollutants, and to achieve this with a satisfactory lifetime, yet without reducing the intrinsic filtration performance for each component forming the composition.

To do this, a study was conducted that consisted in evaluating activated carbons and new adsorbents according to the previously cited ISO standard, but also in evaluating them according to a novel method using a series of pollutants at low concentrations and in mixtures, while still monitoring the test temperature and humidity. This study allowed simulation of realistic conditions for use, such as those encountered in polluted areas. From this study, the performance of new carbons was able to be evaluated, but it also allowed the selection of a zeolite with specific affinity for the pollutants selected.

The invention therefore relates to a composition comprising an activated carbon and a zeolite, the zeolite comprising Fe ions.

From the results, a specific combination of a zeolite, an ion, and an activated carbon was able to be selected. This specific combination showed surprising effects regarding how well it filtered pollutant gases. There is synergy in the way the composition filters pollutant gases. Indeed, this composition delivers filtration results for pollutant gases that are better than the sum of the respective results for the activated carbon and the zeolite.

Advantageously, the zeolite comprises 0.1 to 1.2% by mass of Fe ions.

Advantageously, the Fe ions are ferric or ferrous ions.

Advantageously, the Fe ions are held inside the zeolite.

Advantageously, the zeolite has a ZSM-5 crystalline structure.

Advantageously, the zeolite has an $SiO_2/Al_2O_3$ molar ratio of between 60 and 20.

Advantageously, the zeolite has an $SiO_2/Al_2O_3$ molar ratio of between 50 and 30.

Advantageously, the zeolite has an $SiO_2/Al_2O_3$ molar ratio of 40.

Advantageously, the zeolite is hydrophobic.

Advantageously, the mass ratio of the zeolite to the activated carbon is between 5 and 35%.

Advantageously, the mass ratio of the zeolite to the activated carbon is between 10 and 20%.

Advantageously, the mass ratio of the zeolite to the activated carbon is 15%.

Advantageously, the activated carbon has a B.E.T. surface area of 1004 $m^2/g$, a micropore volume of 0.356 $cm^3/g$, a total pore volume of 0.422 $cm^3/g$ and a median pore diameter of 4.6 Å.

Advantageously, the activated carbon has a B.E.T. surface area of 960 $m^2/g$, a micropore volume of 0.344 $cm^3/g$, a total pore volume of 0.404 $cm^3/g$ and a median pore diameter of 5.0 Å.

Advantageously, the activated carbon has a B.E.T. surface area of 969 $m^2/g$, a micropore volume of 0.327 $cm^3/g$, a total pore volume of 0.346 $cm^3/g$ and a median pore diameter of 6.8 Å.

Advantageously, the activated carbon is a mixture of distinct activated carbons.

The invention also relates to an air filter for a ventilation, heating, and/or air conditioning system comprising the composition according to any one of the previous characteristics.

Advantageously, the zeolite and the activated carbon are arranged in a single layer.

Other characteristics, details, and advantages of the invention will become more clearly apparent upon reading the description given below for information purposes in conjunction with the drawings in which.

Figure 3:
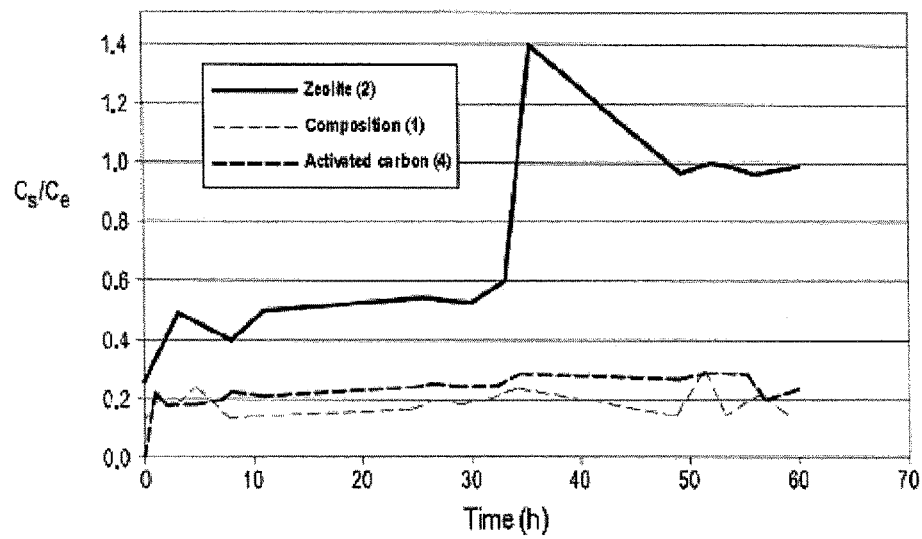
Figure 4:
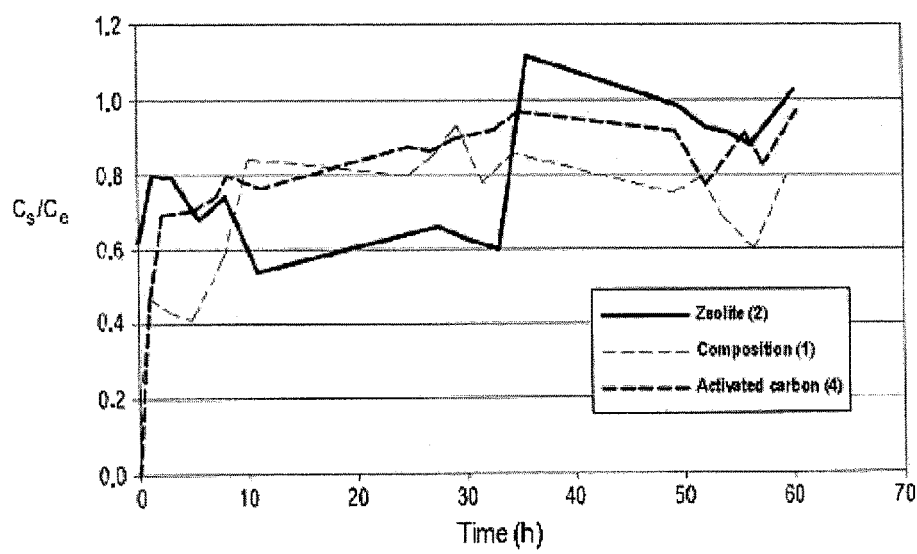
Figure 5:
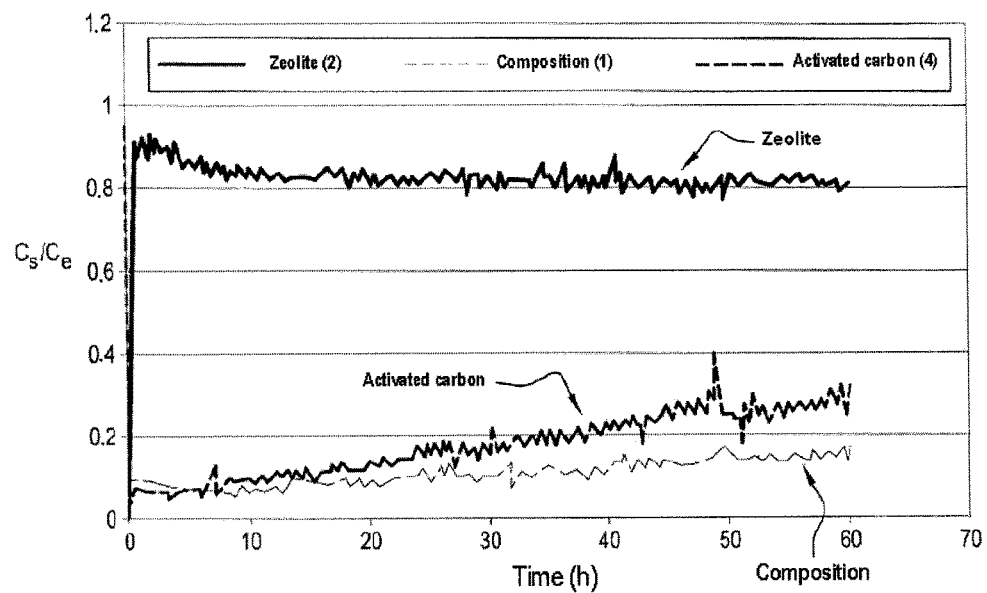
Figure 6:
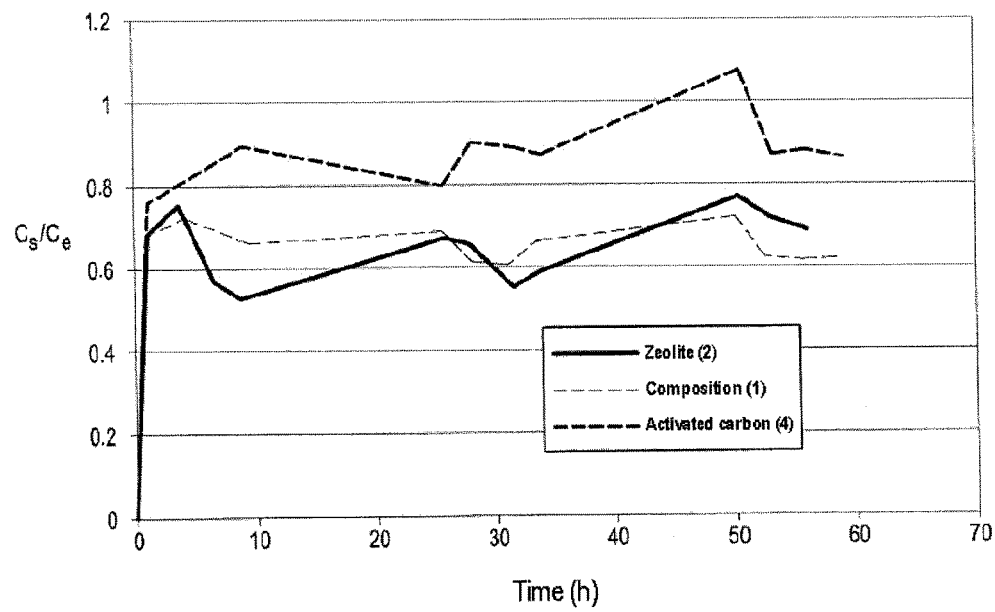
Figure 7:
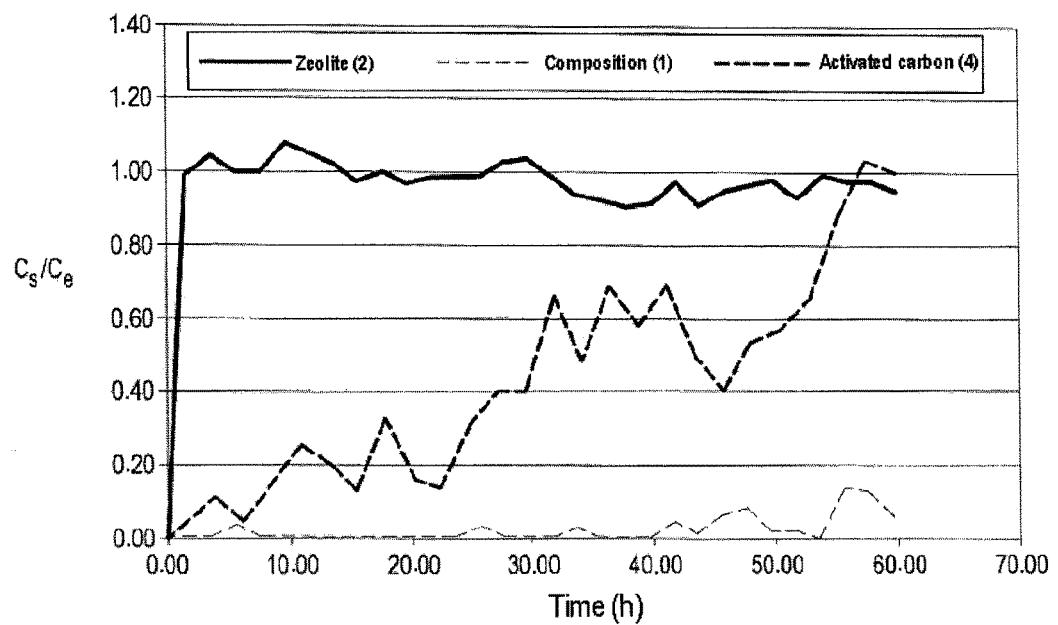
Figure 8:
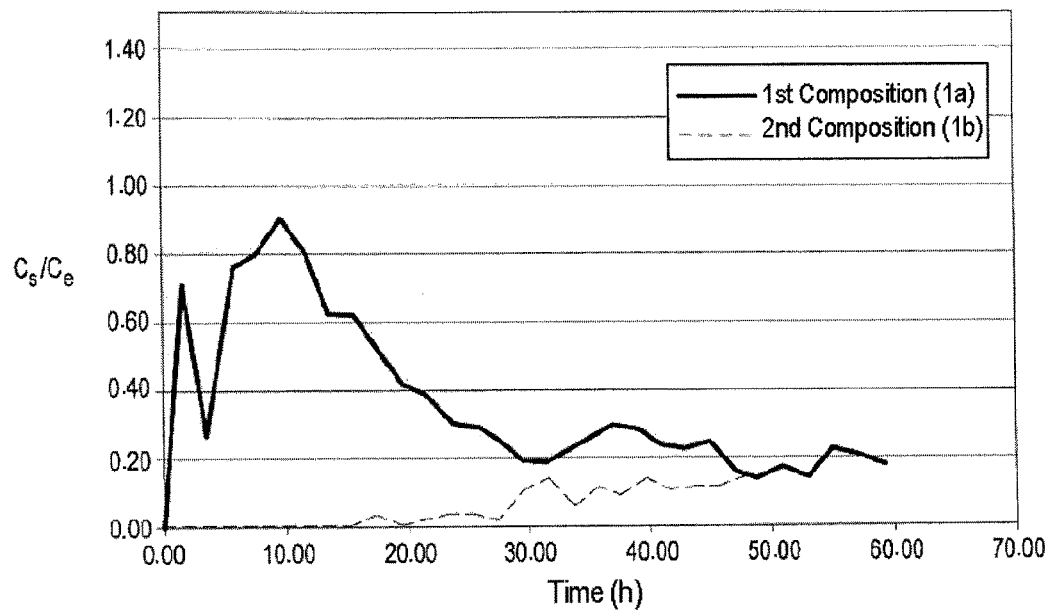
Figures 9, 10:
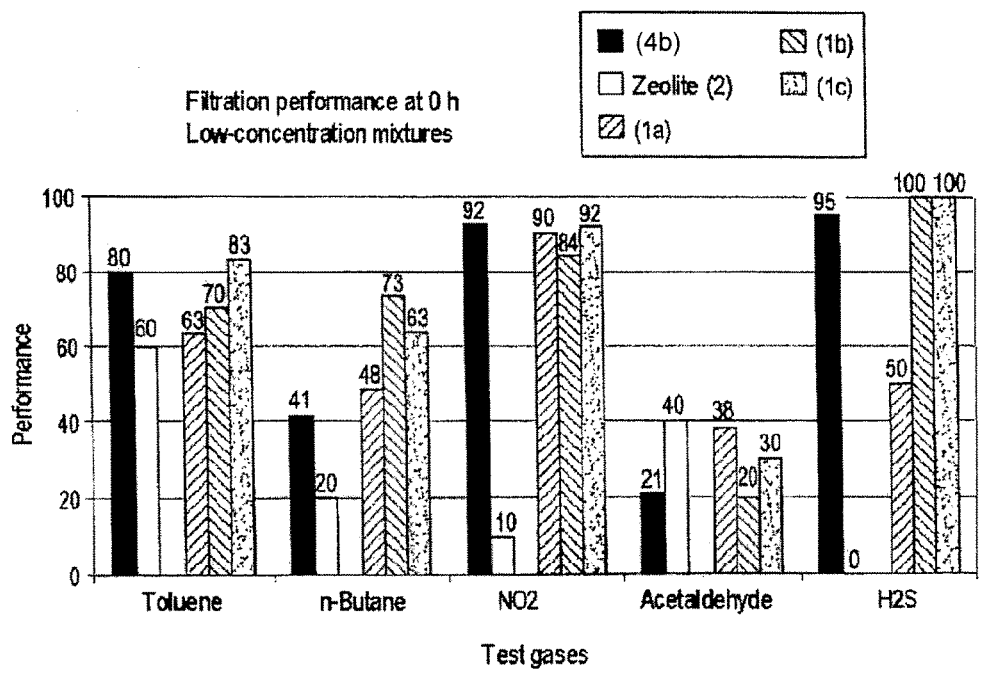
Figure 11:
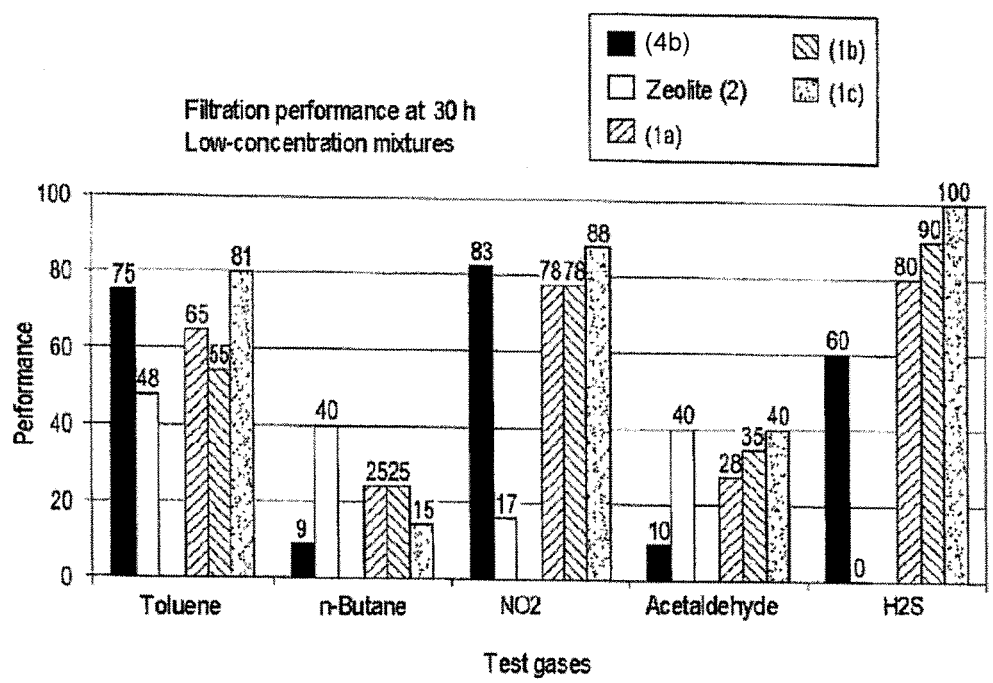
Figure 12:
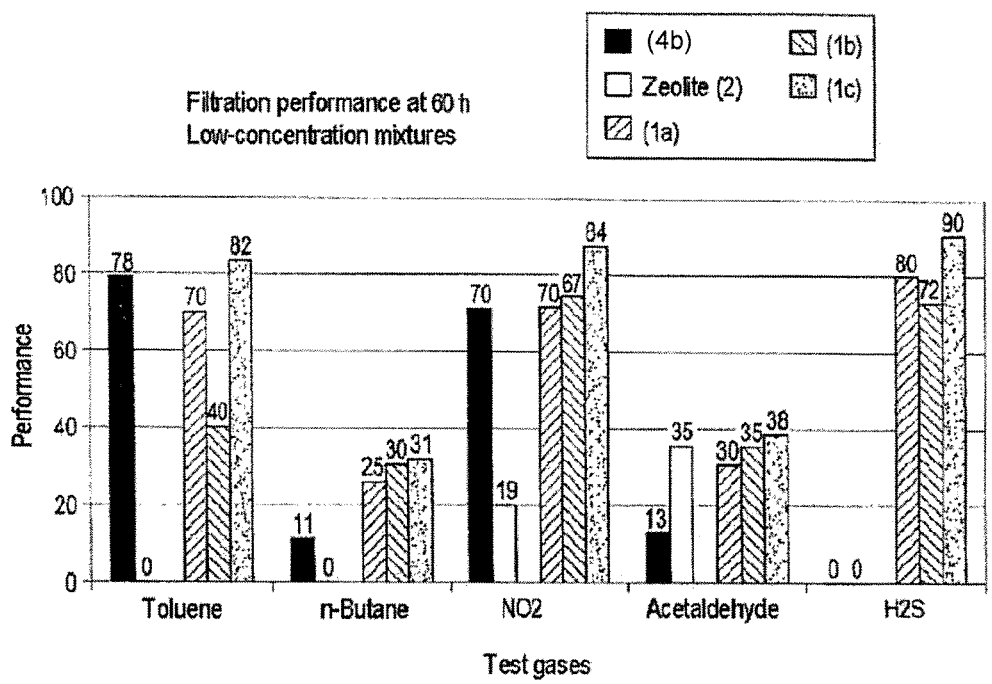
Figure 13:
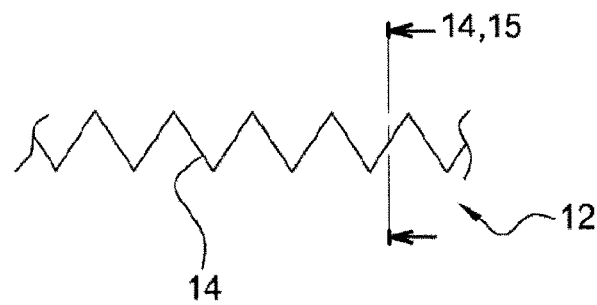
Figure 14:
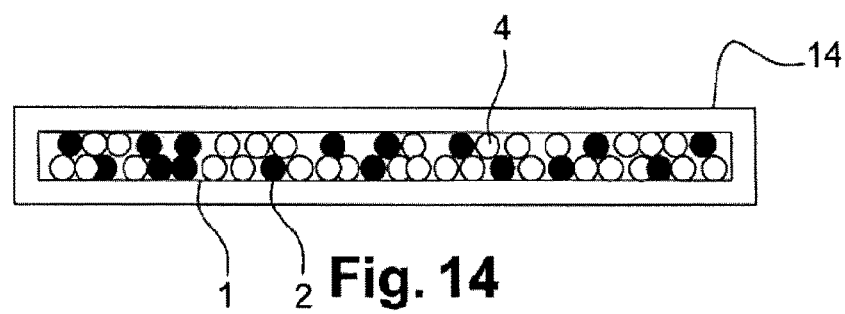
Figure 15:
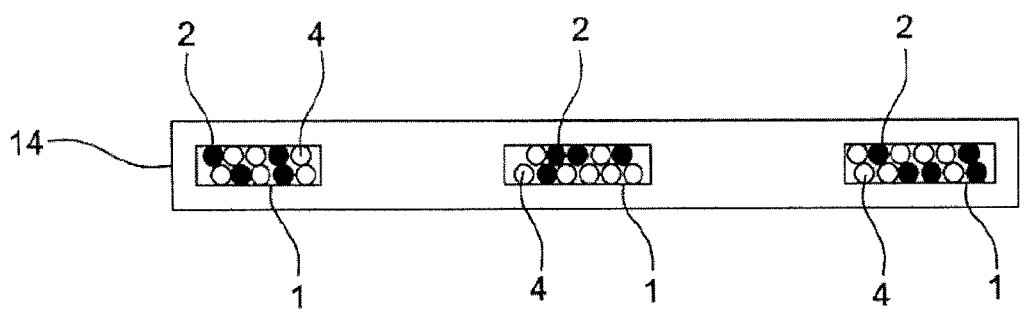

FIG. 3 shows breakthrough curves for toluene at a temperature of 22° C. and 50% humidity FIG. 4 shows breakthrough curves for n-butane at a temperature of 22° C. and 50% humidity FIG. 5 shows breakthrough curves for nitrogen dioxide at a temperature of 22° C. and 50% humidity FIG. 6 shows breakthrough curves for acetaldehyde at a temperature of 22° C. and 50% humidity FIG. 7 shows breakthrough curves for hydrogen sulfide at a temperature of 22° C. and 50% humidity FIG. 8 shows other breakthrough curves for hydrogen sulfide at a temperature of 22° C. and 50% humidity FIG. 9 shows the adsorption capacity for various compositions according to the invention FIG. 10 shows a histogram of filtration performance at 0 hours FIG. 11 shows a histogram of filtration performance at 30 hours FIG. 12 shows a histogram of filtration performance at 60 hours FIG. 13 shows a view of a filter comprising the composition FIG. 14 shows a cross-sectional view of FIG. 14 according to a first variant FIG. 15 shows a cross-sectional view of FIG. 15 according to a second embodiment variant Composition 1 according to the invention comprises at least two adsorbents. Composition 1 comprises a first adsorbent, a zeolite 2 and a second adsorbent, an activated carbon 4. This composition is used to filter pollutant gases inside a ventilation, heating, and/or air conditioning system for an automotive vehicle. More specifically, this composition is used for an air filter for an automotive vehicle.

Figure 1:
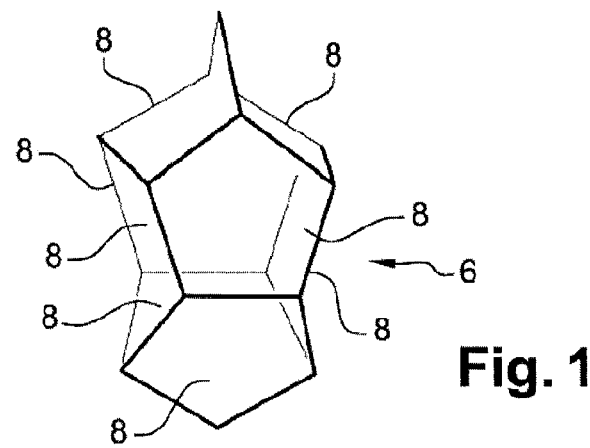
FIG. 1 shows the structure of a pentasil unit

Zeolite 2 has ZSM-5 crystalline structure. This ZSM-5 structure (a structure that is also called pentasil) comprises several pentasil units 6 bound together by oxygen bridges. A pentasil unit 6 comprises eight pentagonal rings 8. The tops of these rings 8 are formed by aluminum (Al) or silicon (Si). Oxygen atoms (O) bond the tops. Accordingly, zeolite ZSM-5 comprises $Al_2O_3$ molecules and $SiO_2$ molecules. FIG. 1 shows a pentasil unit 6 comprising eight rings 8.

Figure 2:
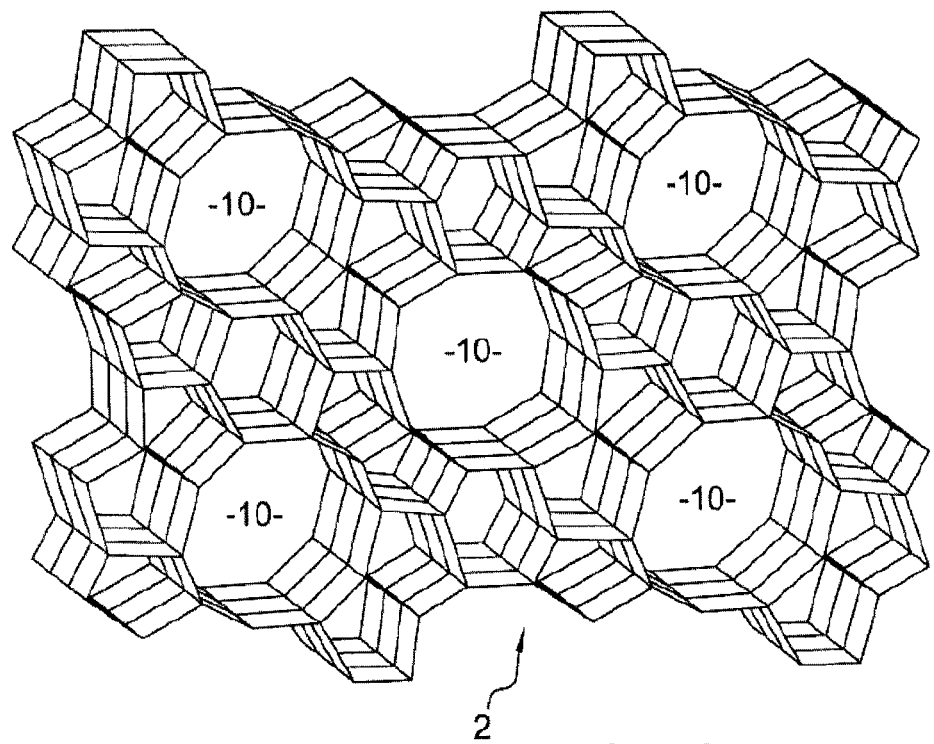
FIG. 2 shows the structure of a zeolite

All of the pentasil 6 units for the zeolite 2 form cages 10 in which ions can be housed. According to the invention, iron ions (hereafter called Fe ions) are housed there. "Fe ion" is understood to mean both ferrous ions ($Fe^{2+}$ ions) and ferric ions ($Fe^{3+}$ ions). FIG. 2 illustrates the formation of cages 10 by pentasil units bonding. The cages are between 5.4 and 5.6 Å (Angström) in size.

Zeolite 2 according to the invention is a hydrophobic zeolite. Furthermore, zeolite 2 has an $SiO_2/Al_2O_3$ ratio of between 20 and 60. Preferably, this ratio is between 30 and 50. According to the invention, zeolite 2 having an $SiO_2/Al_2O_3$ ratio of 40 delivers the best results for filtration tests for pollutant gases. These results will be described later.

The zeolite 2 comprises Fe ions. The mass ratio between the Fe ions and the zeolite is between 0.1 and 1.2%. Preferably, the mass ratio is 0.5%. In the rest of the description, the term "zeolite" is used for the zeolite with crystalline structure ZSM-5 comprising Fe ions.

Composition 1 is formed of granules of zeolite 2 and activated carbon 4. The particle size of composition 1 is between 300 and 600 μm in diameter. Specifically, the activated carbon has, for its particle size, a distribution mode of 300 μm and the zeolite has, for its particle size, a distribution mode of 600 μm. In other words, the activated carbon generally has a diameter of 300 μm and the zeolite a diameter of 600 μm. The values for the diameters of the zeolite and the activated carbon were selected to allow homogeneous mixing and better shaping during the manufacturing process. Accordingly, mixing the zeolite with the activated carbon causes no additional pressure drop or difficulties in implementation.

Composition 1 comprises an activated carbon 4. Two different activated carbons were tested. A first activated carbon 4a used has the following physical properties: B.E.T. surface area of 1004 $m^2/g$, micropore volume of 0.356 $cm^3/g$, total pore volume of 0.422 $cm^3/g$ and median pore diameter of 4.6 Å. A second activated carbon 4b used has the following physical properties: B.E.T. surface area of 960 $m^2/g$, micropore volume of 0.344 $cm^3/g$, total pore volume of 0.404 $cm^3/g$ and median pore diameter of 5.0 Å.

FIGS. 3 to 7 are tables illustrating the breakthrough curves for a pollutant gas, for activated carbon 4b alone, zeolite 2 alone and the composition comprising the zeolite and activated carbon 4b. A breakthrough curve illustrates the efficacy of the filtration of the pollutant gas by the adsorbent or adsorbents selected. On the y-axis, we have a ratio between the concentration of pollutant gas downstream (Cs) of a filter comprising the adsorbent or adsorbents and the concentration of pollutant gas upstream (Ce) of the filter. The terms "downstream" and "upstream" extend according to the direction of travel of an air flow crossing the filter and carrying the pollutant gas. Consequently, the greater the concentration of pollutant gas, the less efficient the adsorption of the pollutant gas by the adsorbent or adsorbents. The results of the tests presented in these tables were performed with low-concentration mixtures.

In FIG. 3, the pollutant gas is toluene. Activated carbon 4b filters toluene well since its concentration never exceeds 0.3. The zeolite alone is very clearly insufficient for filtering toluene, with Cs/Ce ratio peaks above 1.2. As for the composition according to the invention, it filters more effectively than activated carbon 4b alone.

In FIG. 4, the pollutant gas is n-butane. This table shows that the combination of zeolite 2 and activated carbon 4b is more effective on n-butane filtration than activated carbon 4b alone or zeolite alone. More specifically, the composition according to the invention filters better than the cumulative filtrations of activated carbon 4b and zeolite 2. Therefore, there is synergy in combining activated carbon 4b with zeolite 2.

In FIG. 5, the pollutant gas is nitrogen dioxide ($NO_2$). The action of zeolite 2 alone or activated carbon 4b alone on nitrogen dioxide filtration is considerably less than the action of the composition according to the invention. The results of the nitrogen dioxide filtration show that there is synergy in the composition according to the invention and that this composition is not a simple juxtaposition of two adsorbents. Indeed, composition 1 has a Cs/Ce ratio below 0.2 after the adsorbents are exposed to the air flow containing the nitrogen dioxide for 60 hours, whereas zeolite 2 has a Cs/Ce ratio above 0.8 and activated carbon 4b has a Cs/Ce ratio above 0.3.

In FIG. 6, the pollutant gas is acetaldehyde. Composition 1 filters acetaldehyde better than activated carbon 4b alone or zeolite 2 alone. As such, composition 1 has a Cs/Ce ratio below 0.7, whereas the zeolite alone has a Cs/Ce ratio of 0.7.

Therefore, it is understood that the mixture of the zeolite and activated carbon 4b improves the action of the zeolite by itself on the acetaldehyde.

In FIG. 7, the pollutant gas is hydrogen sulfide ($H_2S$). The mixture of zeolite 2 and activated carbon 4b shows a real improvement in the filtration of this pollutant gas compared to a simple juxtaposition of the filtration results for the zeolite alone or activated carbon 4b alone.

In light of FIGS. 3 to 7, it is understood that the fact of mixing the zeolite with activated carbon considerably improves its filtration power for various pollutant gases. In other words, the composition according to the invention improves filtration efficacy for pollutant gases in comparison with a filter comprising a layer of zeolite and a layer of activated carbon, where both layers are physically separated inside the filter. Using activated carbon alone removes pollutant gases (toluene, n-butane, $NO_2$) adequately. The zeolite performs much less well than the activated carbon on the gases cited above but it is advantageous for aldehyde adsorption, and more specifically for adsorbing acetaldehyde and hydrogen sulfide.

Therefore, mixing the two adsorbents increases the efficacy of the adsorbent material for certain specific pollutants while retaining the same performance for other pollutants.

Accordingly, the same performance for toluene, n-butane, and $NO_2$ is maintained in spite of adding the zeolite. Performance for acetaldehyde is considerably improved. The mixture is also effective on $H_2S$. This solution then better protects human health and maintains comfort, while reducing bothersome smells.

So as not to reduce the performance of the activated carbon and to benefit from the addition of the zeolite, the proportion of zeolite must be between 5 and 35% by mass, preferably between 10 and 20%. Even more preferably, the proportion of zeolite is 15% by mass.

FIG. 8 illustrates the breakthrough curve for hydrogen sulfide ($H_2S$) for a first composition 1a a comprising zeolite 2 and the first activated carbon 4a and for a second composition 1b comprising zeolite 2 and the second activated carbon 4b. Although the first composition 1a gives good filtration results for hydrogen sulfide after 30 hours, the second composition 1b filters more effectively. After 30 hours, the first composition 1a has a Cs/Ce ratio below 0.4 and the second composition 1b has a Cs/Ce ratio below 0.2. It emerges from these results that is based the choice of each adsorbent for composition 1 is made deliberately and is based on the convincing filtration results for pollutant gases. Accordingly, beyond the specific choice of zeolite 2 having a ZSM-5 structure and comprising Fe ions, the choice of the activated carbon improves the synergy of the adsorbents of composition 1 even more. Indeed, it appears in light of FIGS. 3 to 8 that the mixture of zeolite 2 with the second activated carbon 4b has the best filtration performance for all the pollutant gases tested. Nevertheless, the first composition 1a comprising zeolite 2 and the first activated carbon 4a delivers better performance than zeolite 2 and activated carbon 4b taken in isolation. This first composition 1a therefore also has synergy compared to a zeolite alone and an activated carbon alone.

FIGS. 9 to 12 illustrate comparative results between different compositions according to the invention. The first composition 1a comprises the first activated carbon 4a and zeolite 2; the mass ratio of zeolite 2 to the first activated carbon 4a is 33%. The second composition 1b comprises the second activated carbon 4b and zeolite 2; the mass ratio of the zeolite to the second activated carbon 4b is 33%. The third composition 1c comprises the second activated carbon 4b and zeolite 2; the mass ratio of the zeolite to the second activated carbon 4b is 15%.

FIG. 9 shows the adsorption capacity for each composition tested for various pollutant gases. It follows that the third composition 1c is the one with the best adsorption capacity, in particular for acetaldehyde, hydrogen sulfide, nitrogen dioxide, n-butane, and toluene.

The tests giving the filtration performance results for FIGS. 10 to 12 are at low concentration (of the order of a few tens of µg/m³ for use in an automotive vehicle) and mixed. Accordingly, a single air flow containing all of the pollutant gases to be tested crosses the air filter comprising the composition according to the invention. Further, the pollutant gases tested are as follows: toluene, n-butane, nitrogen dioxide, acetaldehyde, and hydrogen sulfide.

FIG. 10 shows that the third composition 1c leads to better filtration than the zeolite alone or activated carbon 4b alone at 0 hours, i.e. at the moment when the air flow crosses the air filter. Indeed, for toluene, the filtration performance for the third composition 1c is 83, whereas for zeolite 2 it is 60 and for activated carbon 4b it is 80. This is also true for n-butane and hydrogen sulfide. For nitrogen dioxide, the performance is the same for the third composition 1c and activated carbon 4b (value: 92); and the performance for the third composition 1c is clearly better than that of zeolite 2.

FIG. 11 gives the results for filtration performance at 30 hours. The third composition 1c performs better than the other compositions 1a, 1b and than zeolite 2 alone and activated carbon 4b alone for toluene, nitrogen dioxide, and hydrogen sulfide. For acetaldehyde, the filtration for the third composition 1c is equivalent to the zeolite alone.

In FIG. 12, the results for filtration performance at 60 hours illustrate the fact that the third composition 1c has the best filtration performance for toluene, n-butane, nitrogen dioxide, acetaldehyde, and hydrogen sulfide compared to the other compositions 1a, 1b, to the zeolite alone and to the activated carbon alone.

The invention also relates to an air filter 12 for a ventilation, heating, and/or air conditioning system comprising the composition according to the invention. The air filter 12, illustrated in FIG. 13, comprises a filtering medium 14 in which composition 1 is housed. The filtering medium 14 is a non-woven material with several folds. As described previously, composition 1 is a mixture of zeolite 2 and activated carbon 4b, where the mixture delivers better filtration performance than that obtained by zeolite 2 alone or activated carbon 4 alone. Zeolite 2 comprises Fe ions. Composition 1 is therefore formed by a single layer as described in FIG. 13. "Single layer" is understood to be the fact that the zeolite and the activated carbon are mixed together and that no physical obstacle separates them. Inside the air filter, the composition is distributed either inside the whole filtering medium (FIG. 14) or by strips inside the filtering medium (FIG. 15). As a variant, the composition is arranged on the filtering medium.

As a variant, the composition comprises at least a third adsorbent. For example, the composition comprises the zeolite, the activated carbon, the activated carbon being a mixture of distinct activated carbons. Accordingly, the composition comprises three adsorbents: the zeolite and two distinct activated carbons. "Distinct" is understood to mean the fact that the activated carbons forming the mixture have different physical properties. For example, the mixture of activated carbons is formed by the first activated carbon 4a and the second activated carbon 4b. A third activated carbon 4c having the following characteristics is also used. This third activated carbon 4c has the following physical properties: micropore volume of 0.327 cm³/g, total micropore volume of 0.346 cm³/g, micropore volume percentage of 95%, median pore diameter of 6.8 Å and B.E.T. surface area of 969 m²/g. This activated carbon is commonly called "activated carbon NC60". The mixture of activated carbon is therefore either the mixture of the first and second activated carbons 4*a* and 4*b*, or the first and the third activated carbons 4*a* and 4*c*, or the second and the third activated carbons 4*b* and 4*c*.

The invention claimed is:

1. A composition comprising an activated carbon and a zeolite,
   wherein the zeolite comprises 0.1 to 1.2% by mass of Fe ions,
   wherein the zeolite has a ZSM-5 crystalline structure,
   wherein the mass ratio of the zeolite to the activated carbon is 15%, and
   wherein the activated carbon has a B.E.T. surface area of 960 m$^2$/g, a micropore volume of 0.344 cm$^3$/g, a total pore volume of 0.404 cm$^3$/g and a median pore diameter of 5.0 Å.

2. The composition of claim 1, wherein the Fe ions are ferric or ferrous ions.

3. The composition of claim 1, wherein the Fe ions are held inside the zeolite.

4. The composition of claim 1, wherein the zeolite has a SiO$_2$/Al$_2$O$_3$ molar ratio of between 60 and 20.

5. The composition of claim 1, wherein the zeolite has a SiO$_2$/Al$_2$O$_3$ molar ratio of between 50 and 30.

6. The composition of claim 1, wherein the zeolite has a SiO$_2$/Al$_2$O$_3$ molar ratio of 40.

7. The composition of claim 1, wherein the zeolite is hydrophobic.

8. The composition of claim 1, wherein the activated carbon is a mixture of distinct activated carbons.

9. An air filter for a ventilation, heating, and/or air conditioning system comprising the composition of claim 1.

10. The air filter of claim 9, wherein the zeolite and the activated carbon are arranged in a single layer.

* * * * *